Dec. 2, 1924.
W. A. FOOTE
FOOT BICYCLE
Filed Aug. 30, 1922
1,517,352
2 Sheets-Sheet 1
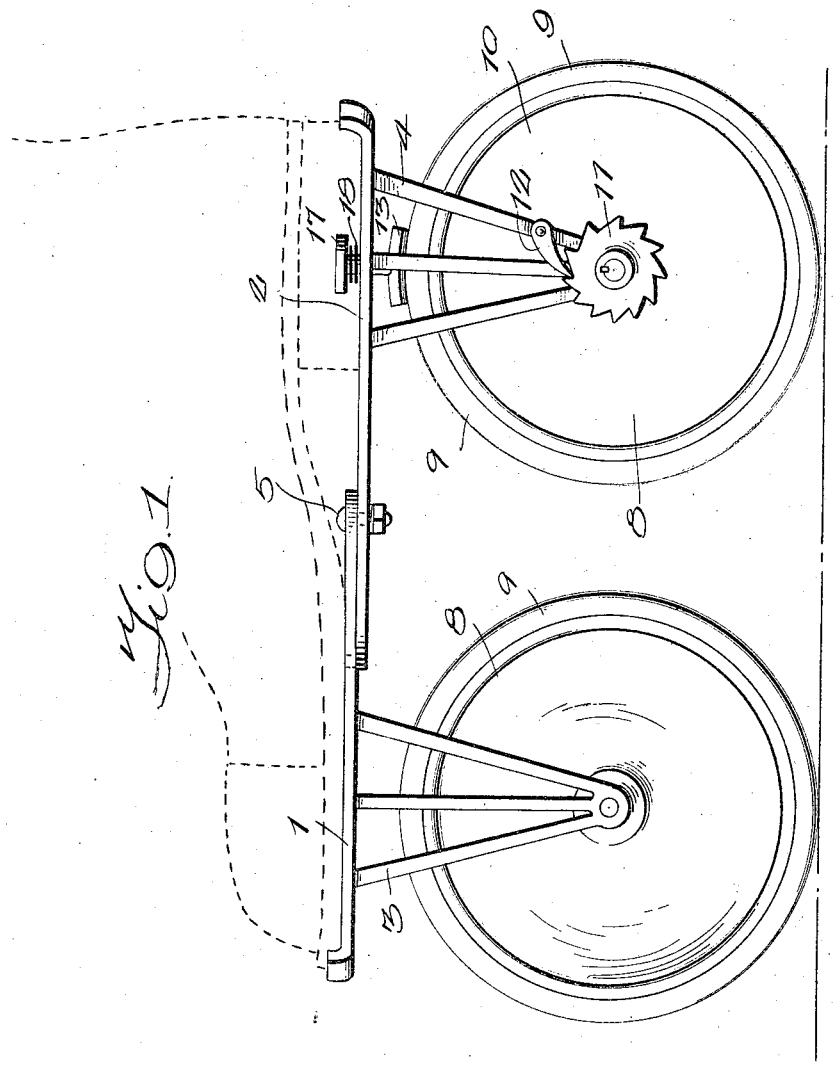
WITNESSES
R. A. McLeod.
Inventor
W. A. FOOTE,
By Richard B. Owen
Attorney

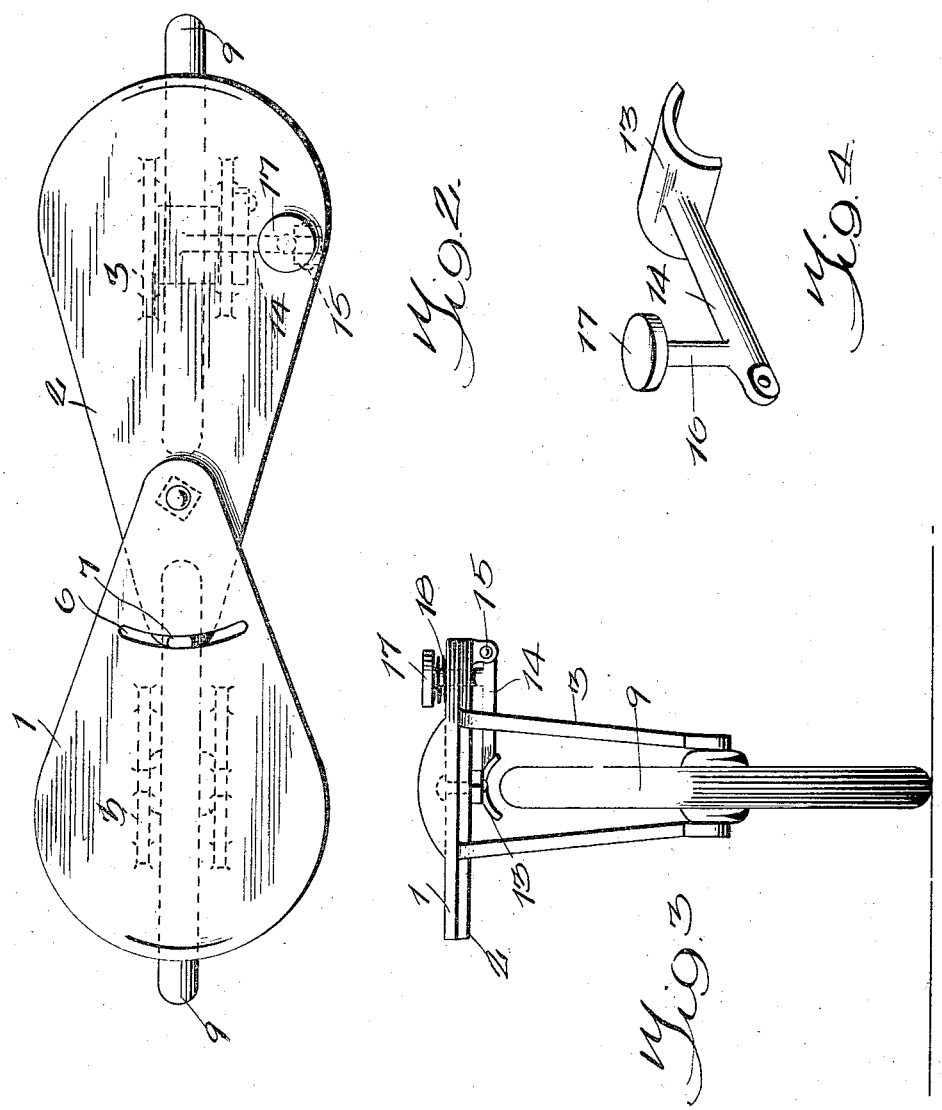

Patented Dec. 2, 1924.

1,517,352

UNITED STATES PATENT OFFICE.

WILLIAM A. FOOTE, OF GARFIELD, NEW MEXICO.

FOOT BICYCLE.

Application filed August 30, 1922. Serial No. 585,210.

*To all whom it may concern:*

Be it known that I, WILLIAM A. FOOTE, a citizen of the United States, residing at Garfield, in the county of Dona Ana and State of New Mexico, have invented certain new and useful Improvements in a Foot Bicycle, of which the following is a specification.

The present invention relates to a foot bicycle formed similar to a skate and operated in a like manner therewith having for its principal object to provide a structure capable of ready operation with little effort on the part of the user.

Another important object of the invention is to provide a structure including a toe and heel plate pivoted together each of which is provided with a single roller or wheel.

Another object of the invention is to provide simple and efficient braking means for the device.

With the above and numerous other objects in view as will appear as the description progresses, the invention resides in certain novel features of construction, and the combination and arrangement of parts as will be hereinafter more fully described and claimed.

In the drawing:—

Figure 1 is an elevation of the device embodying my invention,

Figure 2 is a top plan thereof,

Figure 3 is a front elevation thereof, and

Figure 4 is a detailed perspective of the brake mechanism.

Referring to the drawing in detail it will be seen that a toe plate 1 and a heel plate 2 are each provided with the boss 3 and 4. The plates 1 and 2 taper toward each other and the tapered end of the plate 1 extends over the tapered end of the plate 2 and the tapered end of plate 1 is pivoted to the intermediate portion of the plate 2 by a bolt 5 or any other suitable means. This plate 1 is provided with an intermediate curved transversely extending slot 6 for receiving a lug or pin 7 projecting upwardly from the tapered end of the plate 2. These plates 1 and 2 are provided with suitable means, not shown, for attaching the same to the shoe of a user. The wheel 8 is suitably carried by the fork 3 so as to rotate therein and is preferably provided with a pneumatic or cushion tire 9. The rear wheel 10 is constructed similar to the wheel 8 being provided with the same kind of tire 9. On the wheel 10 there is mounted a ratchet 11 rotatable therewith and engageable with a dog 12 carried by the fork 4 so that this wheel can only rotate in a forward direction, preventing the foot bicycle from moving backwards as it is being propelled up-hill.

A curved brake block 13 forming part of a brake mechanism is engageable with the tire 9 of the rear wheel 10 and is carried by a lever 14 pivoted at 15 to the bottom of the plate 2 adjacent one side thereof. A rod or extension 16 is provided on the lever 14 and extends through the plate 2 terminating in a head 17. A spring 18 is mounted about this rod 16 between the head 17 and the plate 2 so as to normally hold the lever 14 in a raised position, that is so that the brake block 13 is out of engagement with the tire 9 of the wheel 10. When it is desired to apply the brake the heel of the user is raised and shifted so as to rest upon the head 17 and when his weight is applied thereto the brake block 13 will be placed in engagement with the tire 9 of the rear wheel 10 forming an efficient brake therefor as will be readily understood from an inspection of the drawings.

Having thus described my invention what I claim as new is:—

1. In combination, a toe plate, a heel plate, means for pivoting one end of said toe plate to an intermediate portion of said heel plate, said toe plate provided with a transversely extending curved intermediately disposed slot, a pin on the end of said heel plate engageable in said slot, and locomotion means provided on each of said plates.

2. In combination, a toe plate, a heel plate, means for pivoting one end of said toe plate to an intermediate portion of said heel plate, said toe plate provided with a transversely extending curved intermediately disposed slot, a pin on the end of said heel plate engageable in said slot, locomotion means provided on each of said plates, and a brake mechanism associated with said locomotion means.

In testimony whereof I affix my signature in presence of two witnesses.

WILLIAM A. FOOTE.

Witnesses:
L. F. ELLIOTT,
L. N. BARKSDALE.